July 31, 1962  J. R. WESTELL  3,047,753
ELECTRIC MOTOR HOUSING
Filed March 11, 1959
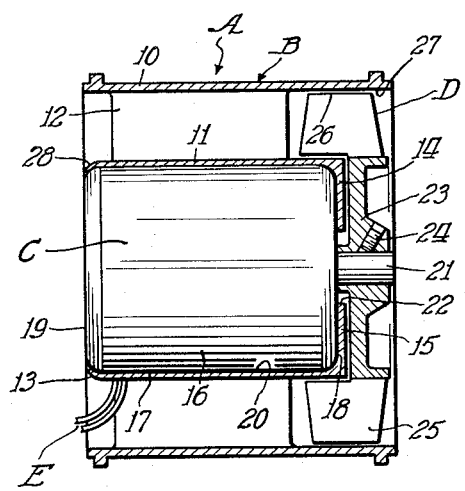
Inventor:
John R. Westell
By: Frank C. Parker Atty.

3,047,753
ELECTRIC MOTOR HOUSING
John R. Westell, Chagrin Falls, Ohio, assignor to Borg-Warner Corporation, Chicago, Ill., a corporation of Illinois
Filed Mar. 11, 1959, Ser. No. 798,769
1 Claim. (Cl. 310—91)

This invention relates to an improved electric motor housing, and, in particular, relates to an improved means and method for mounting an electric motor within an axial flow fan housing.

It is well known in the art to provide an axial flow fan assembly comprising an outer hollow cylindrical housing, and an inner hollow cylindrical housing supported concentrically within the outer hollow housing by a plurality of radially disposed stator vanes formed integrally with the inner and outer hollow housings. The inner hollow housing is normally provided with a pair of opposed ends, one of the ends being opened and the other end having a portion thereof projecting radially inwardly to provide a suitable abutment means against which a suitable electric motor is mounted when inserted within the inner hollow housing through the opened end thereof. The electric motor normally comprises a separate unit having a cylindrical outer housing case and a pair of opposed ends, the cylindrical case being adapted to be complementarily received within the inner housing and one of the ends being adapted to engage the abutment means of the inner housing. The motor is provided with a drive shaft which projects through a suitable aperture formed in the abutment means and is adapted to support a hub of a rotary fan. The fan hub carries a plurality of radially disposed vanes or blades disposed within the outer hollow housing, the peripheries of the blades being disposed closely spaced to the internal peripheral surface of the outer housing. In this manner, upon rotation of the fan through actuation of the electric motor, the fan causes air or other fluid to enter one end of the housing assembly, flow axially therethrough and flow out the other end of the housing assembly, the direction of axial flow being dependent upon the direction of rotation of the fan and the particular configuration of the blades.

Many different means have been utilized for properly securing an electric motor within the inner housing of the above mentioned axial flow fan assembly. One method of mounting the motor within the assembly has been to directly secure the motor casing to the abutment means of the inner housing by a plurality of bolts passing through the abutment means and being secured within the end of the motor casing. Another means has been to secure a separate plate to the open end of the inner housing once the motor has been disposed therein. After the plate has been secured to the housing assembly, the plate is attached to the other end of the motor casing by suitable bolts.

It has been found, however, that when axial flow fan assemblies of the above described type are made relatively small, it is difficult to utilize fastening bolts because of the confining area in which to work. Further, the time involved in properly securing the motor within an axial flow fan assembly results in a high percentage of the production and maintenance costs thereof.

Therefore, it is an object of this invention to provide an improved axial flow fan assembly.

It is another object of this invention to provide an axial flow fan assembly having improved mounting means for securing an electric motor therein.

Another object of this invention is to provide a new method for securing an electric motor in an axial flow fan assembly.

A further object of this invention is to provide an improved axial flow fan assembly comprising an outer hollow housing, an inner hollow housing disposed within the outer hollow housing and being interconnected therewith by a plurality of vanes, the inner housing having a pair of opposed ends, one of the ends providing an abutment means, and a motor having a pair of end walls and being disposed in the inner housing with one of the end walls disposed in engagement with the abutment means, the other end of the inner housing having at least a portion thereof disposed against the other end wall of the motor to secure the motor within the inner housing against the abutment means.

Other objects, uses, and advantages of this invention will become apparent from a reading of the following specification taken in connection with the accompanying drawing forming a part thereof and wherein:

The single FIGURE of the drawing illustrates, in an axial cross-sectional view, an axial flow fan assembly formed in accordance with the teachings of this invention.

Reference is now made to the accompanying drawing illustrating an axial flow fan assembly, generally indicated by the reference letter A, including a housing B, an electric motor C, and a fan D.

The housing B comprises an outer hollow cylindrical housing 10 and an inner hollow cylindrical housing 11 disposed concentrically within the outer hollow housing 10 and secured thereto by a plurality of stator vanes 12 disposed radially within the housing B and integrally connecting the housings 10 and 11 together. The inner housing 11 has an opened end 13 and a substantially closed end 14, the closed end 14 being defined by a radially inwardly projecting abutment means 15 formed integrally with the inner housing 11. The outer housing 10, stator vanes 12, and inner housing 11 may be cast integrally to provide a monoblock construction or formed separately and secured together in any feasible manner.

The motor C includes a motor case 16 having a cylindrical outer peripheral surface 17 and a pair of opposed ends 18 and 19. The diameter of the cylindrical surface 17 of the motor C slightly exceeds the diameter of an internal peripheral surface 20 of the inner housing 11. In this manner, when the motor C is inserted through the opened end 13 of the inner housing 11, the motor C is press-fitted within the inner housing whereby the frictional engagement between the cylindrical surface 17 of the motor C and the internal peripheral surface 20 of the inner housing 11 maintains the motor C in a predetermined rotational position relative to the housing B. The motor C is press-fitted within the housing 11 until the end 18 thereof engages the abutment means 15 of the inner housing 11, the motor C having a shaft 21 projecting from the end 18 thereof and being adapted to project through an aperture 22 formed in the abutment means 15.

The fan D having a hub 23 is telescopically received on the shaft 21 after the motor C has been disposed within the inner housing 11. The fan D is secured to the motor shaft 21 in any feasible manner, such as by fastening means 24. The fan D includes a plurality of fan blades 25 carried by the hub 23, the blades 25 projecting radially outwardly from the hub 23. When the fan D is mounted on the shaft 21 of the motor C, the outer peripheries or ends 26 of the fan blades 25 are disposed closely adjacent but slightly spaced from an internal peripheral surface 27 of the outer housing 10.

In order to secure the motor C within the housing B after the same has been press-fitted into the inner housing 11 and disposed against the abutment means 15 thereof, the opened end 13 of the inner housing 11 is adapted to have at least a portion thereof turned or crimped substantially radially inwardly at 28 against the end 19 of the motor C. In this manner, the portion 28 of the inner housing 11 is adapted to secure the motor C in the inner housing 11 against the abutment means 15.

By thus assembling the electric motor C within the housing B, rotational movement of the motor C relative to the housing B is prevented by the press-fitting relation of the motor casing 16 with the internal peripheral surface 20 of the inner housing 11, and axial movement of the motor C relative to the housing B is prevented by the abutment means 15 and the engaging portion 28 of the open end 13 of the inner housing 11 respectively engaging the opposed ends 18 and 19 of the motor C. It is to be understood that the entire opened end 13 of the inner housing 11 may be crimped or turned inwardly against the end 19 of the motor C if desired. Therefore, it can be seen that an improved mounting means and mounting method has been disclosed for securing the motor C in an axial flow fan assembly without utilizing conventional fastening means.

The operation of the axial flow fan assembly A will now be described. Electrical current is supplied to the motor C through suitable leads E and switching means in a manner well known in the art. When the motor C is energized, the motor C causes rotation of the shaft 21 and thus rotation of the fan D. Upon rotation of the fan D, the fan D causes an axial flow of air or other fluid through the housing B between the inner housing 11 and the outer housing 10. By changing the design of the fan blades 25 and/or the direction of rotation of the shaft 21, the flow of air created thereby can be moved to the right or left through the axial flow fan assembly A. The stator vanes 12 are adapted to control the flow of fluid therethrough. However, it is to be understood that the stator vanes 12 can be curved or designed in any desired manner to create any particular flow pattern.

While this invention has been disclosed in connection with a certain specific embodiment thereof, it is to be understood that this is by way of example rather than limitation, and it is intended that the invention be defined by the appended claim.

What is claimed is:

An electric motor housing comprising an outer hollow cylindrical housing; an inner hollow cylindrical housing disposed within said outer housing and being connected thereto by a plurality of vanes, said inner housing having a pair of opposed ends, one of said ends providing an abutment plate projecting radially inwardly from said inner housing; means defining an opening in said abutment plate; a motor case having a pair of end walls, a motor disposed in said case and having a rotatable shaft extending through one of said end walls, said case being disposed in said inner housing with said one end wall disposed in engagement with said abutment plate and said shaft projecting through said opening, the other of said ends of said inner housing being turned substantially radially inwardly from said inner housing against the other of said end walls of said motor as the sole means for securing said motor case in said inner housing against said abutment plate.

References Cited in the file of this patent

UNITED STATES PATENTS

| | | |
|---|---|---|
| 2,107,481 | Johnson | Feb. 8, 1938 |
| 2,397,170 | Jenkins | Mar. 26, 1946 |
| 2,427,032 | Troller et al. | Sept. 9, 1947 |
| 2,571,374 | Mayr | Oct. 16, 1951 |
| 2,698,393 | Merkle | Dec. 28, 1954 |
| 2,774,251 | Price | Dec. 18, 1956 |

FOREIGN PATENTS

| | | |
|---|---|---|
| 8,666 | Great Britain | of 1894 |